Apr. 10, 1923. 1,451,631
A. ROSNER
FUEL SYSTEM FOR INTERNAL COMBUSTION ENGINES
Filed June 24, 1918 3 sheets-sheet 2
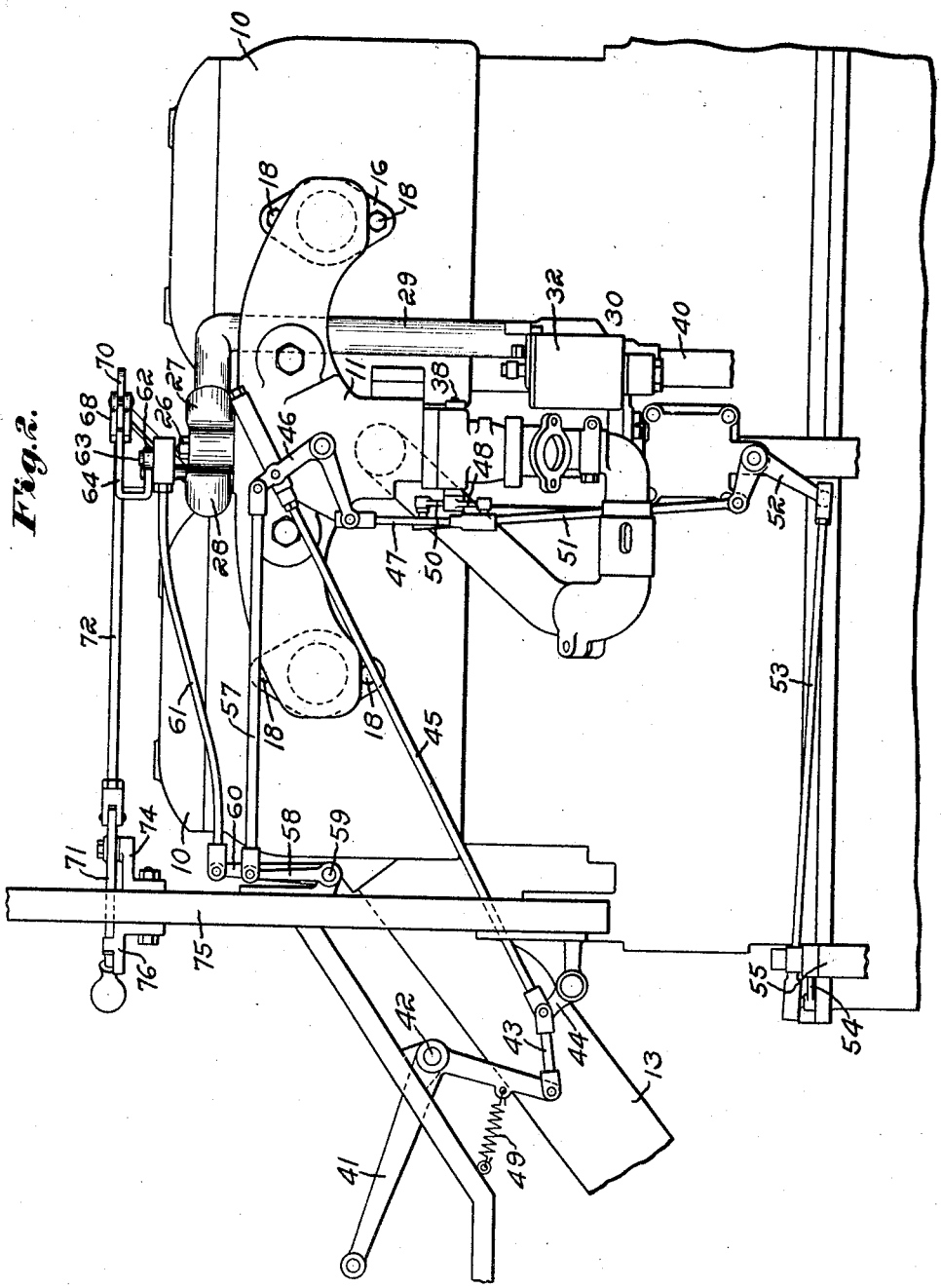
Inventor:
Adolph Rosner,
by Emery, Booth, Janney & Varney
Attys

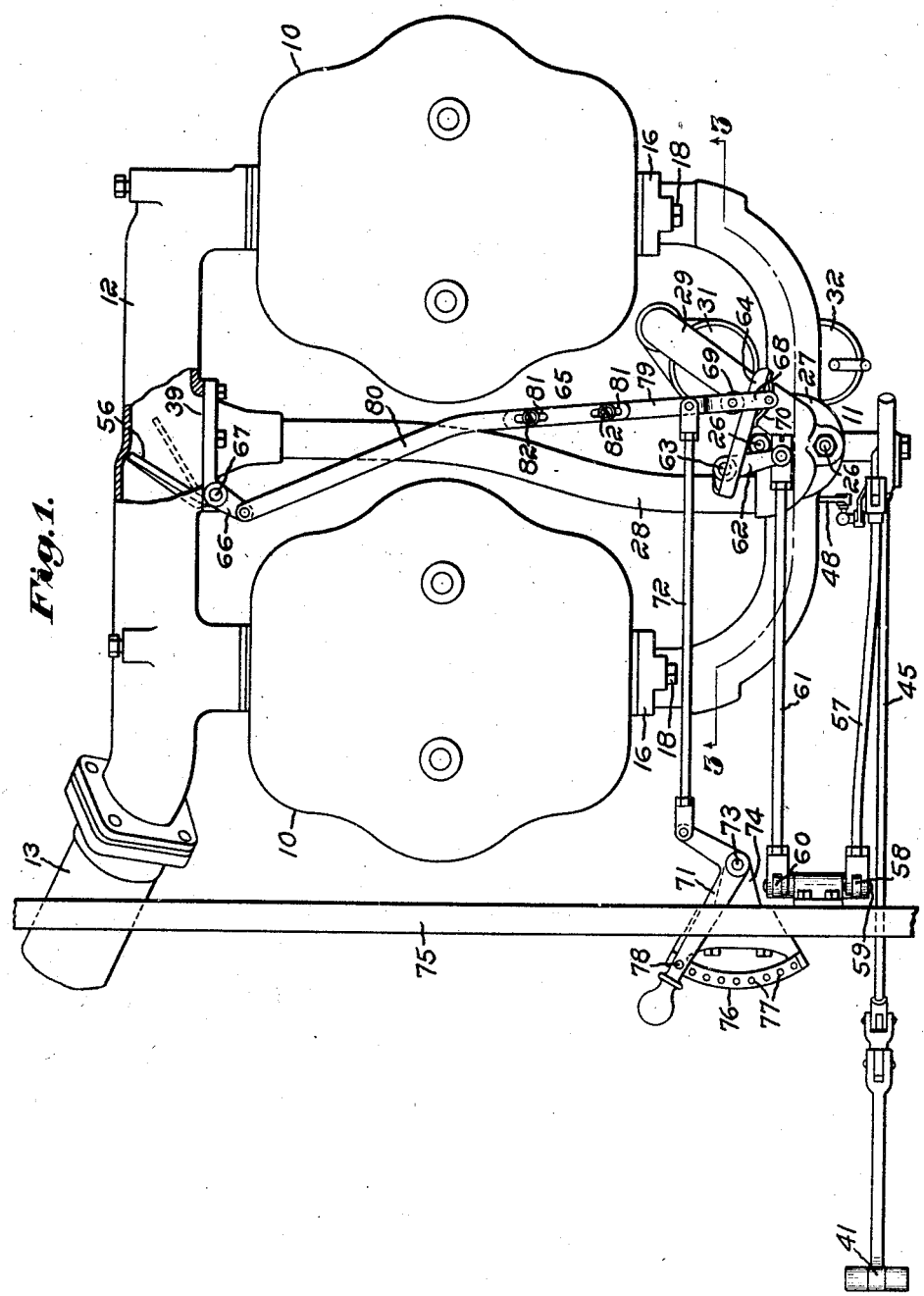

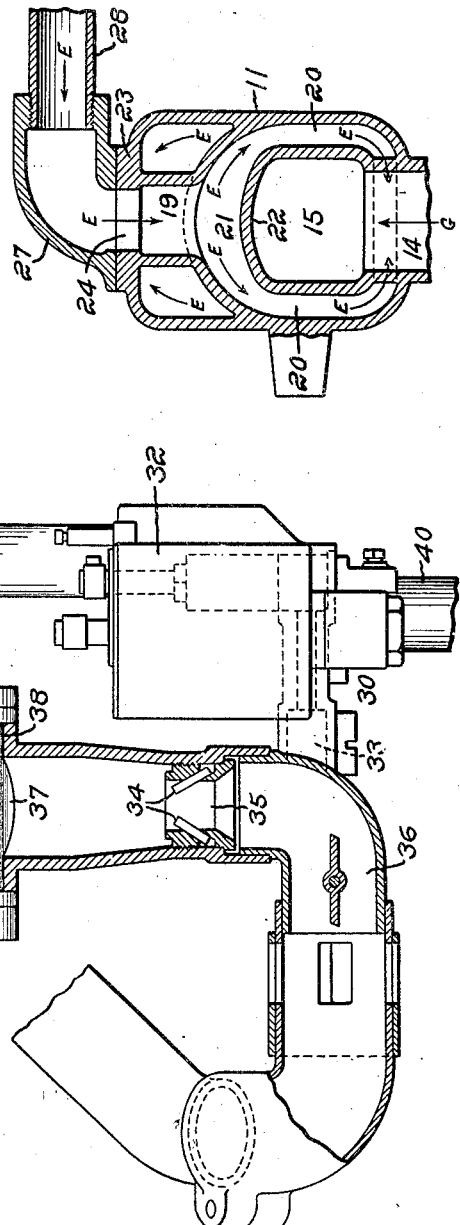
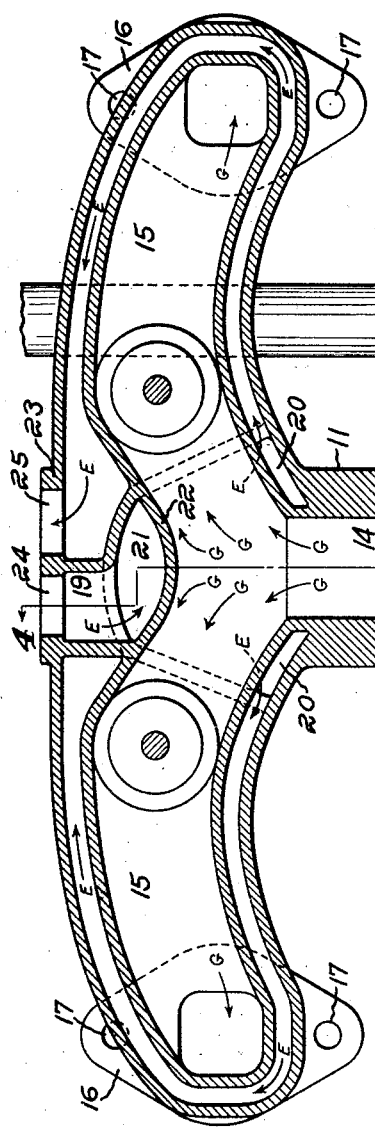

Patented Apr. 10, 1923.

1,451,631

UNITED STATES PATENT OFFICE.

ADOLPH ROSNER, OF BRIDGEPORT, CONNECTICUT, ASSIGNOR, BY MESNE ASSIGNMENTS, TO THE LOCOMOBILE COMPANY, OF BRIDGEPORT, CONNECTICUT, A CORPORATION OF DELAWARE.

FUEL SYSTEM FOR INTERNAL-COMBUSTION ENGINES.

Application filed June 24, 1918. Serial No. 241,721.

*To all whom it may concern:*

Be it known that I, ADOLPH ROSNER, a citizen of the United States, and a resident of Bridgeport, county of Fairfield, and State of Connecticut, have invented an Improvement in Fuel Systems for Internal-Combustion Engines, of which the following description, in connection with the accompanying drawings, is a specification, like characters on the drawings representing like parts.

This invention relates to fuel systems for internal combustion engines, and is more particularly concerned with means for varying the amount of heat applied to the fuel, in accordance with the requirements of the engine, there being automatic control conjointly with the operation of the throttle valve, with provision for adjustment at will to regulate the heat to suit the particular conditions under which the engine is operating.

My invention will be best understood by reference to the following description, when taken in connection with the accompanying drawings of one specific embodiment thereof, while its scope will be more particularly pointed out in the appended claims.

In the drawings:

Fig. 1 is a plan of an internal combustion engine equipped with a fuel system embodying my invention, a portion of the exhaust manifold being broken away and shown in section the better to illustrate the valve for controlling the application of heat to the fuel;

Fig. 2 is a side elevation of the same, viewed from the intake side;

Fig. 3 is a detail sectional view, on an enlarged scale, on line 3—3 of Fig. 1; and Fig. 4 is a detail sectional view on line 4—4 of Fig. 3.

Referring to the drawings, and to the embodiment of my invention which is illustrated therein, I have shown for purposes of exemplification an internal combustion engine of the four-cylinder type, having its cylinders cast in pairs 10—10, which receive their supply of combustible mixture through any appropriate intake manifold, such as a manifold 11. The exhaust gases may be carried away by an exhaust manifold 12 leading to an exhaust pipe 13.

While the intake manifold may be of any usual or desired construction, I have herein shown a manifold which, per se, is not my invention, the same being provided with a fuel intake passage having an inlet trunk 14 and two branches 15 to conduct the vaporized fuel to the engine cylinders 10, to which the manifold may be secured in any suitable manner, as by providing the same with flanges 16 having holes 17 to receive usual studs 18. The mixture of air and fuel drawn from the carbureter hereinafter described into the inlet trunk 14 flows through the branches 15 to the engine cylinders 10 in streams, whose directions are indicated by the several arrows G in Figs. 3 and 4.

In the use of the grades of gasoline now being supplied, and more especially in cases where it is attempted to use kerosene or distillate as a fuel much difficulty is experienced owing to the fact that the vaporized fuel has a strong tendency to condense. Some of the liquid fuel is deposited in the intake passages, and some is carried even into the cylinders. This is attended by several undesirable results, including the rapid formation of carbon deposits, to say nothing of the lack of economy, and the difficulties had with the proper functioning of the engine. These troubles are too well known to require further description.

In the intake manifold selected for illustration, there is provided a heating fluid passage adapted to receive some suitable hot fluid, such for example as the exhaust from the engine. This stream of heating fluid is conducted in proximity to the fuel passages and in such a way as to secure the best possible results. In the present example, I have shown a heating fluid passage having a trunk 19 (see Figs. 3 and 4) and two branches 20 leading therefrom. Preferably, the inlet trunk 19 for the heating fluid is adjacent the inlet trunk 14 for the combustible mixture, and preferably one trunk leads in the opposite direction with respect to the other. In the present example, the arrangement is such that the heating fluid is brought into the manifold transversely of the branch passages 15 of the fuel conduit, and is then conducted about the incoming stream of gaseous fuel through the use of a chamber 21, which, in turn, communicates with the branches 20.

Thus there is provided at this point where the fuel enters and is divided into two streams what is known as a "hot spot," at which the heat is concentrated just as the mixture of vaporized fuel and air leaves the carburetor. It should here be noted that at the lower part of the chamber 21, where the inlet trunk 19 delivers the hot exhaust, said chamber is provided with a wall 22, extending in general direction transversely of the entering stream of hot exhaust, as well as transversely of the stream of vaporized fuel and air which enters the fuel intake trunk 14. Thus it should be evident that both streams impinge in opposite directions on opposite surfaces of the wall 22, thus perfecting the vaporization of the hydrocarbon, which is more or less in the condition of a fog mixture when it strikes the surface.

By reference to Fig. 4, it will be observed that the branches 20 lead from the chamber 21 in a downward direction about the sides of the fuel conduit to a point beneath the branches of the latter, and then longitudinally of and beneath said branches. By this means, any liquid fuel gravitating to the bottom of the fuel passages is subjected to the heating effect of the stream of hot exhaust therebeneath, and is revaporized. The branches 20 lead then in an upward direction transversely of the branches 15, as best shown at the extreme right and left-hand ends of Fig. 3, and then above and longitudinally of the branches 15, and in the opposite direction, as best shown in the upper portion of Fig. 3. Thus it is evident that the stream of heating fluid is conducted first transversely, then lengthwise of and in the same direction as the stream of gaseous fuel, and then lengthwise of and in the opposite direction, passing first beneath the fuel passage and then above. By this means, the best effect is secured, since the greatest heat of the exhaust gas is applied where it is most needed, and after it has become somewhat cooled, it is carried along the surface of the upper portion of the fuel conduit where less heat is needed. The direction of flow of the exhaust gas is indicated by the several arrows E in Figs. 3 and 4.

Any suitable provision may be made for connecting the heating fluid passages to suitable conduits to conduct the heating fluid to and from the manifold 11, but in the present example, I have provided the latter with a boss 23, best shown in Figs. 3 and 4, having an opening 24 for the entrance, and an opening 25 for the exit of said fluid. Herein this boss is threaded to receive studs 26, by means of which the manifold may be secured to a header, 27, to which are connected conduits 28 and 29.

As a means for supplying a combustible mixture to the intake manifold, I may provide any usual or desired carburetor, such as a carburetor 30, which per se forms no part of my invention, and hence it is unnecessary here to show or describe it in detail, except that it may be noted that the carburetor selected for illustration is one of the type using two fuels, one a highly explosive hydrocarbon, such as gasoline, and the other a heavier and less explosive hydrocarbon such as kerosene or distillate. To this end, the carburetor selected for illustration is provided with two usual and well-known float chambers 31 and 32, either of which is adapted to deliver liquid fuel through a passage 33 leading to one or more nozzles 34, which deliver the stream of atomized fuel into the throat of a Venturi tube 35, best shown in Fig. 3. It is unnecessary here to describe the remaining details of the carburetor, since they have nothing whatever to do with my present invention, it being understood that the engine operates in a usual and well-known manner to draw air through an intake passage 36, and through the Venturi tube 35 into the mixing chamber thereabove, whence it is delivered into the intake manifold 11 under the control of a suitable throttle valve 37, herein of the well-known butterfly type, having a stem 38.

Referring again to the pipe 28 (see Fig. 1), hereinbefore described, which is used to conduct exhaust gas to the intake manifold 11 to heat the latter, said pipe may be connected to the exhaust manifold 12 in any appropriate manner but I have herein provided the latter with an opening 39, which may be and is herein intermediate the cylinder units 10. By this means, the hot exhaust gases taken from the manifold 12 through the opening 39 into the pipe 28 are conducted in proximity to the combustible mixture, while the latter is on its way to the cylinders. After the exhaust gas has been utilized to heat the intake manifold, it is cooled to a considerable extent, and if desired it can then be led through the hereinbefore described pipe 29 to a point adjacent the kerosene float chamber 31, to raise the temperature of the latter to facilitate carburetion, after which the gases are conducted by a pipe 40 to any suitable point.

Now it must be evident that, in a system of this kind, when the engine is operated at high speed or under a heavy load, and with a comparatively wide throttle opening, the engine generates more heat than is the case when the engine is running at a slower speed, and under a lighter load, especially when it is idling. This difference is well illustrated by the difference between the conditions which obtain when a motor vehicle is ascending a grade, as compared with those which exist when the vehicle is descending, especially as in the latter case, the engine is usually idling, but the forward motion of the vehicle, due to the down grade, produces a more or less rapid cooling effect. It is obvious that unless special provision is made, the fuel system will receive too much heat when the engine is running under heavy load or at high speed, and not enough when it is running under light load or at low speed. To the end that these difficulties may be avoided, I have provided interconnecting means between the fuel-throttling means and the fuel-heating means to cause a decreased heating effect accompanying an increased fuel supply on the one hand, and an increased heating effect accompanying a decreased fuel supply on the other hand, as I shall now describe.

In connection with fuel systems for internal combustion engines, it is customary to provide a manually operable throttle controlling lever, and a foot-operated throttle-controlling lever, the latter being commonly called the accelerator pedal, both of which levers are connected by suitable mechanism to the throttle valve in such a manner that either may be availed of for the control of the valve. In the present example, I have omitted any showing of the manually-operable lever, but in Figs. 1 and 2, I have shown a common form of accelerator pedal 41, fulcrumed at 42, and connected to the throttle valve stem 38 by suitable connections, including a link 43, an arm 44, a link 45, a bell-crank lever 46, a link 47 and an arm 48, the latter being secured to said valve stem. The arrangement is such that depression of the pedal 41 causes the throttle valve to open, while the latter is closed by a usual spring 49, herein connected at one end to the pedal, and at its other end to a suitable fixed point. The manual control, as herein partially illustrated, includes an arm 50, secured to the throttle valve stem 38 and connected by a link 51, bell-crank lever 52, link 53 and arm 54, to a rockshaft 55, the latter being usually connected to the well-known manually operable lever (not shown) which is customarily mounted on the steering column of a motor vehicle.

As a means for varying the heating effect, I have herein provided at a suitable point in the exhaust system an exhaust controlling valve 56 (see Fig. 1), herein disposed in the exhaust manifold 12 adjacent the lateral opening 39 intermediate the two cylinder units 10. When this valve is disposed in the position shown in full lines in Fig. 1, all of the exhaust gas of one cylinder unit is diverted and compelled to flow through the pipe 28 and header 27 into and through the passages 19 and 20 of the intake manifold, and thence out again through the header 27, whence it passes through the pipe 29 to a point adjacent the float chamber 31, heating the latter, and then on out through the pipe 40 to the atmosphere. Under these circumstances, the full heating effect of the exhaust of one cylinder unit is utilized to heat the combustible mixture and the liquid fuel.

When, however, the exhaust controlling valve 56 is moved from the position shown in full lines in Fig. 1 until it closes the opening 39, the supply of exhaust gas is entirely cut off from the pipe 28, and all of the exhaust gases pass out through the exhaust manifold 12 and exhaust pipe 13. It is evident that in various intermediate positions of the valve, different heating effects can be secured by diverting more or less of the hot exhaust gas, according to the position which the valve occupies. It is desirable that the action of the valve should be automatic, so that without the operator giving the matter thought, said valve shall open the opening 39 as the fuel throttle valve closes, and close said opening as the throttle valve opens. To this end, I have herein provided interconnecting means between the fuel controlling valve and the exhaust throttle valve. These means may take various forms, but in the present example include a link 57 connecting the bell-crank lever 46 to an arm 58, the latter being secured to a rockshaft 59, to which is also secured an arm 60 connected by a link 61 to a lever 62, the latter being fulcrumed on a suitable pivot 63, and having an arm 64 connected by a link 65 to an arm 66, which is secured to a shaft 67 carrying the exhaust controlling valve. The arrangement is such that when the fuel throttle valve opens to give an increased fuel supply, the exhaust controlling valve moves in the proper direction to give a decreased heating effect, while on the other hand, when the fuel throttle valve closes to decrease the fuel supply, the exhaust controlling valve increases the heating effect. From the foregoing, it is evident that the control of the heat supplied to the fuel system is automatic, and that the heating effect is varied from time to time, in accordance with the particular conditions under which the engine is operated.

Now it must be evident that changes in the temperature of the atmosphere, from time to time, naturally affect the temperature of the engine, and that the amount of heat applied to the fuel might be correct at one time, but not at another. It should also be evident that, under some circumstances, it might become desirable to run the engine entirely on gasoline in which case, it might be desirable to have no heat applied to the mixture. I have, therefore, provided means to adjust the connections between the throttle valve and the exhaust controlling valve, so that the effective range of operation of the latter can be increased or diminished without affecting the operation of the fuel throttle valve, and moreover, if desired, the exhaust controlling valve may be maintained in its closed position. One simple and convenient means for accomplishing these results is to provide an adjustable connection between the arm 64 and link 65, so that the latter may be moved toward and from the fulcrum of the arm. From an inspection of Fig. 1, it is evident that when the link 65 is adjacent the outer end of the arm 64, the latter, in swinging to and fro in response to movements of the accelerator pedal, will impart a maximum movement to the link. When, on the other hand, the latter is shifted so that it is in line with the axis of the fulcrum 63, swinging movement of the arm 64 has no effect whatever on the link. Various intermediate positions of the link 65 between zero and maximum will give, of course, correspondingly different ranges of movement of the exhaust controlling valve 56, as compared with a given movement of the fuel throttle valve. It should here be noted, by reference to Fig. 2, that the arm 64 is offset from the body of the lever 62, so that the link 65 can be brought to the axis of the fulcrum 63 without interference. The link 65 may be adjustably connected to the arm 64 by any other appropriate means, but in the present example, I have provided said link with a bifurcated or forked terminal portion 68 to receive said arm, and have provided a roller 69 and a spring 70 bearing against opposite sides, respectively, of said arm, as clearly shown in Fig. 1. By this means, the link 65 may be moved to and fro lengthwise of the arm 64, while still maintaining its operative connection therewith, and without lost motion. Obviously, the arm 64 serves as a crank arm and forms one instance of a crank means operating a connecting rod 80.

I may provide any suitable means to adjust the link 65 toward and from the axis of the arm 64, but in the present example, have shown a manually-operable bell-crank lever 71, connected by a link 72 to the link 65. The bell-crank lever may be fulcrumed at 73 on any suitable support 74, located at any convenient point within the reach of the operator, usually on a dash 75. As a means for normally holding the bell-crank lever fixed in the desired position of adjustment, I may provide any suitable means such as a segment 76 having a series of openings 77 to receive a detent pin 78.

It should now be evident that the interconnecting means between the two valves can be manually adjusted from time to time to suit changes in seasons or temperature of the atmosphere from day to day, as may be required, and that when once adjusted for the particular conditions under which the engine is operated, the mechanism will operate automatically to vary within suitable limits the amount of heat supplied to the fuel. If desired, the link 65 may be adjustable for length, as by making the same in two parts 79 and 80, one provided with a pair of slots 81 to receive clamping screws 82 threaded into the other part. This is done to make it convenient to assemble the mechanism and make the preliminary adjustments.

While I have herein shown and described one specific embodiment of my invention for illustrative purposes, and have disclosed and discussed in detail the construction and arrangement incidental to one specific application thereof, it is to be understood that the invention is limited neither to the mere details or relative arrangement of parts, nor to its specific embodiment herein shown, but that extensive deviations from the illustrated form or embodiment of the invention may be made without departing from the principles thereof.

Having thus described one form of my invention, what I claim and desire by Letters Patent to secure is:

Claims:

1. In a fuel system for internal combustion engines, the combination of engine-heated fuel-supply means, heat-controlling means, fuel-supply controlling means, means interconnecting both controlling means to coordinate their operation, said interconnecting means including a lever and a member actuated thereby, and means available during the operation of the engine to move said member toward and from the fulcrum of said lever to vary the effect of said heat controlling means.

2. In a fuel system for internal combustion engines, the combination of engine-heated fuel-supply means, heat-controlling means, fuel-supply controlling means, means interconnecting both controlling means to coordinate their operation, said interconnecting means including a lever and a member actuated thereby, means operable from a remote point to move said member toward and from the fulcrum of said lever to vary the effect of said heat controlling means, and means also operable from a remote point to retain said member in the desired position of adjustment with relation to said fulcrum.

3. The combination of an internal combustion engine having a purality of cylinders, an exhaust manifold connecting said cylinders and having a main outlet and branch outlet, the latter being intermediate two cylinders, a carbureter, an intake manifold connecting said carbureter to said cylinders and having a fuel-heating jacket, a conduit connecting said branch outlet with said jacket, a fuel throttle valve, an exhaust controlling valve, means interconnecting said valves to cause said exhaust controlling valve to divert more or less exhaust from one of said cylinders through said branch outlet and conduit to said fuel-heating jacket, and means relatively to move said interconnecting means to vary the amount of exhaust so diverted.

4. The combination of an internal combustion engine, an exhaust manifold, a jacketed intake manifold, a branch from said exhaust manifold discharging to the jacket, a valve controlling the entrance to said branch, a throttle for the fuel supply, crank means moving with said throttle, a valve operating connecting rod operated by said crank means and means operable from a remote location as the dash of a vehicle for adjusting the crank means and rod to vary the throw of the latter.

5. The combination of an internal combustion engine having a row of cylinders, an exhaust manifold along one side of the row, a jacketed intake adjacent to the opposite side, a branch from said exhaust manifold extending across the row of cylinders and discharging to the jacket, a valve controlling the entrance of gases to said branch, a throttle for the fuel supply, means moving with said throttle and a rod extending across the line of cylinders for operating said valve and arranged to be thrown by said means.

6. The combination of an internal combustion engine having a row of cylinders, an exhaust manifold along one side of the row, a jacketed intake manifold along the opposite side, a branch from said exhaust manifold extending across the row of cylinders and discharging to the jacket, a valve controlling the entrance of gases to said branch, a throttle for the fuel supply, means moving with said throttle and a rod extending across the line of cylinders for operating the valve and having a connection to said means adjustable to vary the throw of the rod thereby.

7. In a fuel system for internal combustion engines the combination of an engine-heated fuel supply means, controlling means for the heat applied to said fuel supply means, fuel supply controlling means, means interconnecting both controlling means to coordinate their operation including a movable joint to vary the motion transmitted by the connecting means and a means operable from a remote point for adjusting the joint.

8. In a fuel system for internal combustion engines the combination of an engine-heated fuel supply means, controlling means for the heat applied to said fuel supply means, fuel supply controlling means, means interconnecting both controlling means to coordinate their operation including a movable joint to vary the motion transmitted by the connecting means and a means operable from a remote point for adjusting the joint and including a handle provided with a detent and a series of stops cooperating with the detent.

9. The combination with the internal combustion engine of a motor vehicle of an engine-heated fuel supply means, controlling means for the heat applied to said fuel supply means, fuel supply controlling means, means interconnecting both controlling means to coordinate their operation including a movable joint to vary the motion transmitted by the connecting means and a device on the dash for adjusting the joint.

In testimony whereof, I have signed my name to this specification.

ADOLPH ROSNER.